No. 810,866. PATENTED JAN. 23, 1906.
B. V. HOW.
COMPASS INDICATING APPARATUS.
APPLICATION FILED SEPT. 19, 1905.
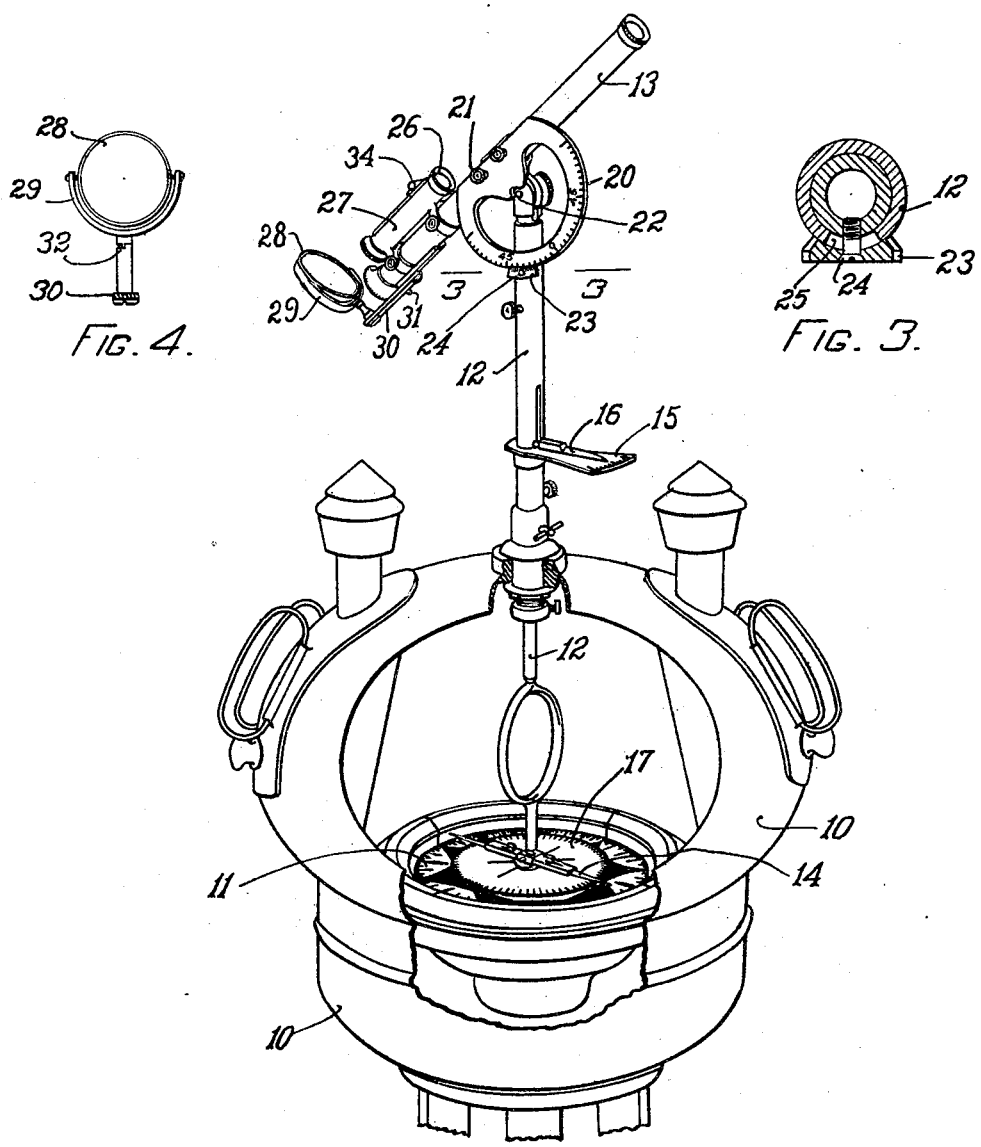
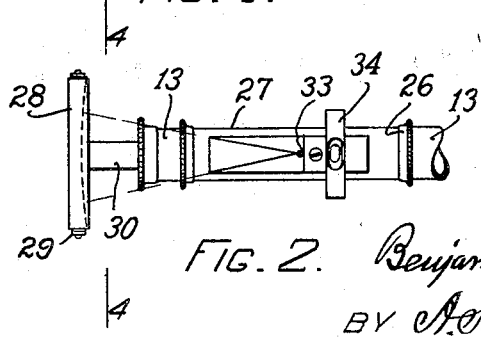
WITNESSES
INVENTOR
Benjamin V. How
BY
ATTY.

UNITED STATES PATENT OFFICE.

BENJAMIN VARNUM HOW, OF WESTON, MASSACHUSETTS, ASSIGNOR TO ARBECAM NAUTICAL INSTRUMENT CO., OF BOSTON, MASSACHUSETTS, A CORPORATION OF MASSACHUSETTS.

COMPASS-INDICATING APPARATUS.

No. 810,866.  Specification of Letters Patent.  Patented Jan. 23, 1906.

Application filed September 19, 1905. Serial No. 279,169.

*To all whom it may concern:*

Be it known that I, BENJAMIN VARNUM HOW, of Weston, in the county of Middlesex and State of Massachusetts, have invented certain new and useful Improvements in Compass-Indicating Apparatus, of which the following is a specification.

This invention is in the nature of improvement upon the so-called "Arbecam alidade" or "compass-indicator," my improvements coöperating with said instrument to perfect its action and increase its general utility. These improvements relate to an adjustable circular triangulation-plate lying flat upon the compass-dial and having the effect of dividing said dial when desired into three hundred and sixty degrees instead of one hundred and twenty-eight nautical points, also to an azimuth-tube parallel with and mounted on the main telescope for observing the sun at midday or otherwise, also to a concave mirror adjustably mounted near the eyepiece of the telescope or azimuth-tube and adapted to throw a pencil of light along the exterior of the barrel and on a glittering point thereon to facilitate observations, as will be explained, and to a spirit-level transversely arranged on the telescope or azimuth-tube of the alidade to denote when the ship is on an even keel.

In the drawings, Figure 1 is a perspective representation of an instrument provided with my improvements and shown mounted on a binnacle partly broken away. Figs. 2, 3, and 4 are enlarged details, Fig. 2 being a top plan showing a portion of the telescope and parts mounted thereon, Fig. 3 a transverse section on line 3 3 of Fig. 1, and Fig. 4 an elevation of the mirror, its arm being in section on line 4 4 of Fig. 2.

The binnacle 10 will be of any approved form inclosing the compass 11, suspended as usual. The top of the binnacle supports a rotatable vertical shaft 12, made in sections and located immediately over the center of the compass-dial. Such shaft carries at top a horizontally-pivoted sighting-tube or telescope 13 and at foot a radial pointer 14, normally maintained in the same radial plane as said telescope. A deviation-corrector 15 16 projects horizontally from said shaft at an intermediate point. I make no claim to these several devices other than in combination with the features of my invention hereinafter described.

The triangulation-plate 17 is a flat circular disk, preferably of metal or glass, graduated marginally in three hundred and sixty degrees and adapted to rest frictionally on the central portion of the compass-dial beneath the radial pointer 14, leaving uncovered the margin of the dial and the usual circle of letters denoting points of the compass. This plate has a central perforation to receive the extremity of shaft 12 or the downwardly-extending tip of the short vertical stem on which the indicating-pointer is pivoted. Said stem fits loosely within, but rotates with, the hollow lower end of shaft 12, as heretofore, and serves as an axis about which the plate 17 may be moved adjustably with relation to the compass by the operator's finger without disturbing the indicator or pointer 14. Thus the zero or north mark can be set at any point on the margin of the compass-dial, and by use of the alidade the distance or angle of visible objects can be ascertained by triangulation.

The altitude-plate 20 is a disk or ring-like device, shown flattened at top and secured at its upper edge to the side of the telescope 13 by clamps or screws 21 in such manner that its center coincides with the prolonged horizontal stem of the screw 22, by which the telescope is secured to the top of shaft 12. The lower portion of said plate is arc-shaped, preferably of semicircular form, and is beveled and graduated marginally in degrees, counting each way from zero at a central point thereon. A vernier-plate 23, constituting an index-point and support or steadying device for the edge of the altitude-plate, is fixed on or connected to the side of the vertical shaft to indicate in degrees on the marginal altitude-scale the inclination up or down of the telescope. When there is no inclination, the zero-point on said scale and the index or zero point on vernier 23 will meet or coincide. Tilting the telescope up or down moves the altitude-plate relatively to the vernier or index point and shows the angle of the sun or any given object sighted through the instrument. Approximate distances of landmarks, vessels, or like objects can thus be observed and noted.

The upper part of shaft 12 is formed of two concentric tubes, as shown in Fig. 3, the telescope 13 being pivoted to the top of the inner tube, as in the Arbecam instrument. I therefore connect the vernier-plate 23 also to the inner tube by a screw 24, which passes through a short transverse slot 25 in the outer tube 12, so that the proper relation of the vernier to the altitude plate will not be disturbed by the radial adjustment of the two members 15 16 of the deviation-corrector, respectively connected to the outer and inner tubes, as heretofore. The back of the vernier-plate is concaved to fit and move upon the outer tube in such adjustments.

27 represents a short supplemental azimuth-tube or small telescope adapted for observing the sun at midday, such tube being fixed to and parallel with the telescope 13 and provided with a colored lens of suitable shade. The eyepiece is provided with a centrally-perforated transverse disk, and when the sun is seen through this minute perforation, which is at the axis of tube 27, the main telescope will point directly to the sun, and the indicator or radial pointer 14 will denote on the compass-dial the exact vertical plane of the sun. The colored lens is mounted in a removable cap 26 at the end opposite the eyepiece. Thus the lens may be removed when the sun is obscured.

For greater convenience in "finding the sun" for midday observations I provide a small concave mirror 28, hung in a yoke 29, erected on a swinging arm 30, which is pivoted to the under side of telescope 13, as in Fig. 1, so that it can be partially folded alongside of the instrument or swung into transverse position at the ends of tubes 13 and 25, as shown. A suitable stop 31 checks this swinging movement of arm 30 at the proper point. The supporting-stem of yoke 29 is shown in Fig. 4 as formed of connected sections, shouldered, as at 32, to permit partial oscillation and form a stop when the mirror is in proper transverse position. When thus transversely placed and tilted on its bearings, said mirror is adapted to throw a converging pencil of light longitudinally along the top of the azimuth-tube, as indicated in Fig. 2. At the exact focus of such reflected rays I locate a pin-head protuberance of burnished metal 33, which seems to blaze with light when the concentrated rays strike it, indicating instantly that the sun is in the direct line of vision through either tube. The mirror may then be swung aside and the observation taken. In this operation the small mirror receives the sun's rays freely and converges them on the barrel of the telescope or azimuth-tube at a defined point when such tube is axially in line with the sun, this method being vastly more comfortable and speedy than the effort to obtain such axial position by looking obliquely upward through the tubes.

To indicate the moment when the ship is on an even keel, my instrument is also furnished with a small spirit-level 34, arranged transversely of the telescope-barrel and preferably mounted on a metal base brazed crosswise on the azimuth-tube, where it may be readily noted while taking observations. The various devices, so far as practicable, should be observed simultaneously by glancing from the light-ray on the azimuth-tube to the bubble in the level, and thence to the pointer on the triangulation-plate, at once noting the degree-mark thereon.

I claim as my invention—

1. In compass-indicating apparatus, a rotatable vertical shaft supported on the binnacle-top and carrying, terminally, a sighting device and a radial indicator, in combination with a circular triangulation-plate perforated centrally, graduated marginally in degrees and maintained frictionally and adjustably on the compass-dial beneath said indicator, and with a reduced downward extension of said shaft serving in such perforation, as an axis of rotation for said plate, substantially as set forth.

2. In compass-indicating apparatus, a rotatable vertical shaft supported on the binnacle and carrying, terminally, a sighting device and a radial indicator, normally maintained in the same vertical plane, in combination with an azimuth-tube fixed on and parallel with the sighting device, such tube having terminally a perforated eyepiece and a removable end cap carrying a colored lens, substantially as and for the purpose set forth.

3. In compass-indicating apparatus, a rotatable sectional shaft supported vertically on the binnacle, a sighting device and radial indicator connected terminally to said shaft, and a supplementary azimuth-tube fixed on said device in the same vertical plane, in combination with a concave mirror adjustably mounted on a swinging arm and adapted to converge the sun's rays at a defined point on said tube, substantially as and for the purpose set forth.

4. In compass-indicating apparatus, a rotatable sectional shaft supported vertically on the binnacle, a sighting device and radial indicator connected terminally to said shaft, and a supplementary azimuth-tube fixed on the sighting device and parallel with the axis thereof, in combination with a concave mirror mounted in bearings in a yoke carried on a swinging arm pivoted to the sighting device and furnished with a suitable stop, and with a spirit-level arranged transversely of the sighting device, to denote when the ship is on an even keel, substantially as set forth.

In testimony whereof I have affixed my signature in presence of two witnesses.

BENJAMIN VARNUM HOW.

Witnesses:
  A. H. SPENCER,
  H. W. LADD.